(12) United States Patent
Han et al.

(10) Patent No.: US 9,056,630 B2
(45) Date of Patent: Jun. 16, 2015

(54) LANE DEPARTURE SENSING METHOD AND APPARATUS USING IMAGES THAT SURROUND A VEHICLE

(75) Inventors: Young In Han, Gyeonggi-do (KR); Young Gi Song, Gyeonggi-do (KR); Won In Back, Gyeonggi-do (KR)

(73) Assignee: IMAGENEXT CO., LTD., Gyeonggi-Do (KR)

( * ) Notice: Subject to any disclaimer, the term of this patent is extended or adjusted under 35 U.S.C. 154(b) by 490 days.

(21) Appl. No.: 13/321,518

(22) PCT Filed: Dec. 24, 2009

(86) PCT No.: PCT/KR2009/007795
§ 371 (c)(1),
(2), (4) Date: Nov. 18, 2011

(87) PCT Pub. No.: WO2010/134680
PCT Pub. Date: Nov. 25, 2010

(65) Prior Publication Data
US 2012/0062745 A1    Mar. 15, 2012

(30) Foreign Application Priority Data
May 19, 2009   (KR) .................. 10-2009-0043649

(51) Int. Cl.
| H04N 7/18 | (2006.01) |
| H04N 5/225 | (2006.01) |
| H04N 13/00 | (2006.01) |
| H04N 13/02 | (2006.01) |
| B62D 15/02 | (2006.01) |
| B60W 50/14 | (2012.01) |

(Continued)

(52) U.S. Cl.
CPC ............. *B62D 15/029* (2013.01); *B60W 50/14* (2013.01); *B60W 30/12* (2013.01); *G08G 1/167* (2013.01)

(58) Field of Classification Search
CPC ................... B60R 2300/804; B60R 2300/105; B60R 2300/303; B60R 2300/607; G08G 1/167; G08G 1/16; G06K 9/00798; B60W 50/14; B60W 30/12
See application file for complete search history.

(56) References Cited

U.S. PATENT DOCUMENTS

| 7,561,181 B2 * | 7/2009 | Schofield et al. ............. 348/148 |
| 2001/0048446 A1 * | 12/2001 | Ishida et al. .................. 345/619 |

(Continued)

FOREIGN PATENT DOCUMENTS

| CN | 1796204 A | 7/2006 |
| CN | 101204957 A | 6/2008 |

(Continued)

*Primary Examiner* — Joseph Ustaris
*Assistant Examiner* — Rebecca Volentine
(74) *Attorney, Agent, or Firm* — Rabin & Berdo, P.C.

(57) ABSTRACT

A method and an apparatus for sensing a lane departure using images that surround a vehicle. The lane departure sensing method includes receiving images that are taken during driving by a plurality of cameras installed in a car, through respective channels connected to the cameras; modifying the obtained images into top-view images to generate a plurality of modified images; compositing the plurality of modified images to generate images that surround a vehicle; extracting a lane from the images that surround the vehicle, and yielding the information on a distance between the vehicle and the extracted lane or the information on an angle between the travel direction of the vehicle and the lane, so as to determine a lane departure; and giving a warning if the lane departure is determined.

5 Claims, 9 Drawing Sheets (51) Int. Cl.
*B60W 30/12* (2006.01)
*G08G 1/16* (2006.01)

(56) References Cited

U.S. PATENT DOCUMENTS

| | | | |
|---|---|---|---|
| 2002/0005896 A1* | 1/2002 | Kumata et al. | 348/148 |
| 2002/0196340 A1* | 12/2002 | Kato et al. | 348/148 |
| 2003/0021490 A1* | 1/2003 | Okamoto et al. | 382/284 |
| 2003/0076415 A1* | 4/2003 | Strumolo | 348/149 |
| 2004/0017378 A1* | 1/2004 | Lin et al. | 345/592 |
| 2006/0142921 A1 | 6/2006 | Takeda | |
| 2007/0085901 A1* | 4/2007 | Yang et al. | 348/47 |
| 2008/0043113 A1* | 2/2008 | Ishii | 348/218.1 |
| 2008/0055114 A1* | 3/2008 | Kim et al. | 340/937 |
| 2008/0192984 A1* | 8/2008 | Higuchi et al. | 382/104 |
| 2008/0231710 A1 | 9/2008 | Asari et al. | |
| 2010/0079590 A1* | 4/2010 | Kuehnle et al. | 348/118 |

FOREIGN PATENT DOCUMENTS

| | | |
|---|---|---|
| CN | 101236654 A | 8/2008 |
| JP | 08-184417 A | 7/1996 |
| JP | 09-039602 A | 2/1997 |
| KR | 2002-0097357 A | 12/2002 |
| KR | 10-0766594 | 10/2007 |

\* cited by examiner

LANE DEPARTURE SENSING METHOD AND APPARATUS USING IMAGES THAT SURROUND A VEHICLE

TECHNICAL FIELD

The present invention relates to a method and an apparatus for generating a surrounding image. More particularly, the present invention relates to a method and an apparatus for sensing lane departure to determine whether a vehicle moves out of a lane by synthesizing images captured by front, rear, left, and right cameras of the vehicle.

BACKGROUND ART

In recent, according to advances in car industry, automobile supply is commercialized such that one household owns one car, and drivers who drive a long distance greatly increase thanks to expansion of expressway and road transportation system. Accordingly, truck drivers having frequent long-distance transportation and long-distance commuters are exposed to a danger of a lane departure accident due to fatigue, carelessness, and drowsy driving caused by long-distance driving.

Generally, Advanced Safety Vehicle (ASV), which is an advanced vehicle applying high electronic technology and control technology to enhance safety of the vehicle, increases the volume of traffic by reducing car accidents, conserves energy, and promotes driver's convenience.

The ASV includes Adaptive Cruise Control (ACC) which automatically controls a distance between vehicles, and Lane Departure Warning System (LDWS) which monitors and warns of lane departure.

Particularly, the LDWS is a safety system which detects the current lane by sensing a front-road image from a camera attached to the vehicle and sounds an alarm when the driver departs the lane due to carelessness or drowsy driving. The LDWS synthetically analyzes a lateral position, a lateral speed, a steering angle, a width of the lane, and a curve of the road based on the image captured by the camera, and informs the user when detecting the lane departure according to the analysis result.

A conventional method detects the lane departure by extracting the lane from the left and right images of the rear side captured by the camera mounted to both side mirrors of the vehicle and calculating the angle formed by the extracted left and right lanes and the direction line of the vehicle. Another conventional method determines the lane departure by recognizing the lane from the front image and the road image captured by the camera mounted to the front of the vehicle and extracting a slope change of the recognized lane.

However, the conventional methods simply combine and display the left and right images of the vehicle and thus cannot accurately determine the current location of the vehicle or the lane departure degree because they do not naturally overlay the images. In particular, it is hard to accurately determine the departure degree of the current vehicle merely with the front image of the vehicle and the driver has difficulty in easily checking the driving condition.

DETAILED DESCRIPTION OF THE INVENTION

Technical Object of the Invention

To address the above-discussed deficiencies, an aspect of the present invention is to provide a method and an apparatus for sensing lane departure using a vehicle surrounding image for accurately sensing the lane departure and allowing a driver to easily recognize the lane departure by synthesizing an image captured by a camera attached to the vehicle to a natural image as much as possible.

Construction and Operation of the Invention

According to one aspect of the present invention, a lane departure sensing method using a vehicle surrounding image includes receiving images captured by a plurality of cameras installed to a car running, over respective channels connected to the cameras; generating a plurality of revised images by revising the captured images into a top-view; generating the vehicle surrounding image by synthesizing the plurality of the revised images; extracting a lane from the vehicle surrounding image, and determining lane departure by calculating distance information between the vehicle and the extracted lane or angle information formed by a moving direction of the vehicle and the extracted vehicle; and when determining the lane departure, issuing a warning.

The generating of the vehicle surrounding image may generate the vehicle surrounding image by overlaying the plurality of the revised images using a mask image which comprises region information per channel and weight information for pixels forming each region.

The camera may be installed in each of a left direction and a right direction of the vehicle, or in each of a front and a rear of the vehicle.

The camera may be installed in each of a front, a left direction, and a right direction of the vehicle.

The camera may be installed in each of a front, a rear, a left direction, and a right direction of the vehicle.

The determining of the lane departure may include displaying a moving direction line indicating a moving direction of the vehicle, around the vehicle; generating the distance information or the angle information by measuring a distance between the moving direction line and the extracted lane and measuring a crossing angle of the moving direction line and the extracted lane; and when the distance information or the angle information exceeds a reference range, determining the lane departure.

According to another aspect of the present invention, a lane departure sensing apparatus using a vehicle surrounding image includes an image input part for receiving images captured by a plurality of cameras installed to a car running, over respective channels connected to the cameras; an image processing part for generating a plurality of revised images by revising the captured images into a top-view; an image synthesis part for generating the vehicle surrounding image by synthesizing the plurality of the revised images; and a lane departure sensing part for extracting a lane from the vehicle surrounding image, calculating distance information of the vehicle and the extracted lane or angle information formed by a moving direction of the vehicle and the extracted vehicle, and determining lane departure based on the calculated distance information or the angle information.

According to yet another aspect of the present invention, a lane departure sensing system using a vehicle surrounding image includes a plurality of cameras installed to a vehicle which is moving and outputting captured images over respective channels; an image generating apparatus for generating a plurality of revised images by revising the captured input images into a top-view, and generating the vehicle surrounding image by synthesizing the plurality of the revised images; a lane departure sensing apparatus for extracting a lane from the vehicle surrounding image, calculating distance information between the vehicle and the extracted lane or angle information formed by a moving direction of the vehicle and the extracted vehicle, determining lane departure from the distance information or the angle information, and issuing a warning when determining the lane departure; and a display apparatus for displaying the surrounding image or a warning screen.

Effect of the Invention

According to the present invention, by removing blind spots around the running vehicle and revising and processing the overlapping region captured by the plurality of the cameras into the natural look, the lane departure can be detected far more accurately. Also, the driver running on the road can recognize the situation around the vehicle and the lane departure information accurately and rapidly without greatly relying on a side-view mirror or a rear-view mirror during the driving, and prevent in advance accidents caused by the drunk driving or the drowsy driving.

CONSTRUCTION AND OPERATION OF THE INVENTION

Exemplary embodiments of the present invention are provided by referring to the attached drawings to assist those of ordinary skill in the art in easily implementing the invention.

Hereinafter, before explaining a lane sensing system using a vehicle surrounding image according to an embodiment of the present invention, a camera installed to the vehicle is described.

Figure 1:
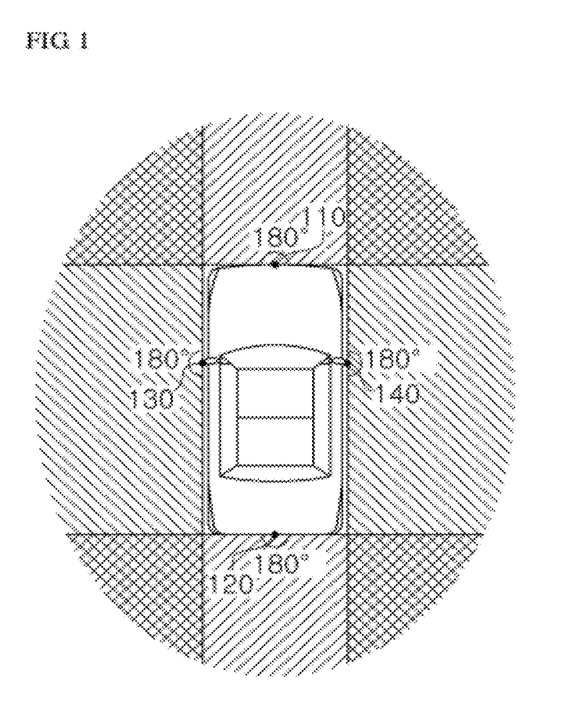
FIGS. 1 through 4 are diagrams of cameras installed to a vehicle according to an embodiment of the present invention.

FIGS. 1 through 4 are diagrams of cameras installed to a vehicle according to an embodiment of the present invention. According to an embodiment of the present invention, by revising images captured by four cameras 110, 120, 130, and 140 of a three-dimensional space installed to the vehicle, a driver can check 360° around the vehicle. The cameras 110, 120, 130, and 140 are installed in front, rear, left, and right sides of the vehicle as shown in FIG. 1, and the camera requires an optical angle over at least 180° to minimize blind spots of the vehicle. To enhance quality of the vehicle surrounding image, an installation height of the camera is set to maintain a region of the overlapping view angle of two cameras at least 1000×1000 mm². As the installation height of the camera is high, better image quality can be attained. As such, it is important to select the locations of the cameras to address the blind spots of the vehicle and to set the installation location and the view angle to minimize the image quality degradation of the synthesized surrounding image.

Figure 2:
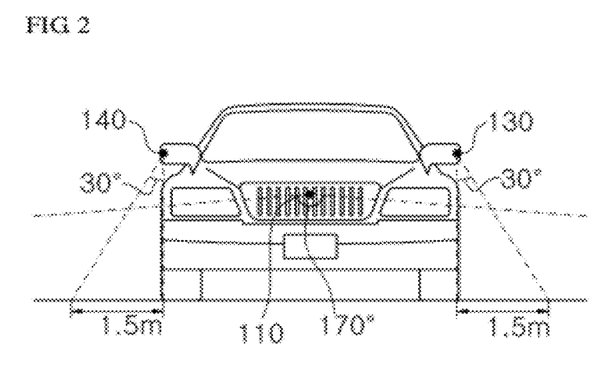
Figure 3:
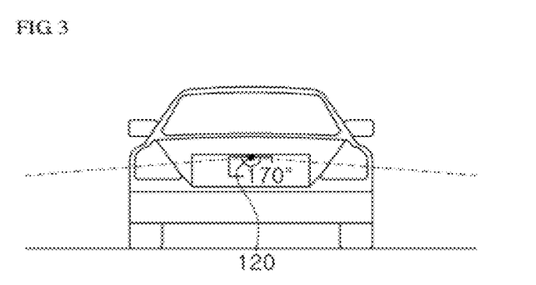
Figure 4:
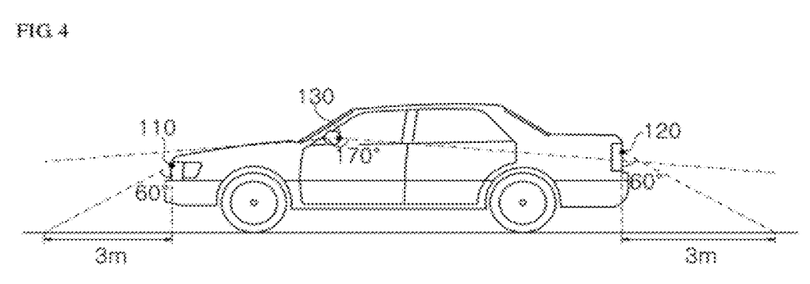

Referring to FIGS. 2 through 4, the locations of the four cameras installed to the vehicle (a sedan car in FIGS. 1 through 4 by way of example) are explained in more detail. As shown in FIG. 2, the front camera 110 is installed to the center of a hood of the vehicle, and the left camera 130 and the right camera 140 are installed at the edge of or below both side-view mirrors of the vehicle. The rear camera 120 is installed at the center above a rear bumper as shown in FIG. 3. Herein, the front camera 110 and the rear camera 120 are installed to capture more than 170° based on the vertical line of the ground direction.

It is preferable to maintain the same height of the front camera 110 and the rear camera 120 and similarly to maintain the same height of the left camera 130 and the right camera 140 as shown in FIG. 4. This is to minimize different sizes of a surrounding object, rather than representing the same lane widths in the overlapping region, when the surrounding image is synthesized, because the height and the angle (PAN/TILT) of the camera vary scale and image quality of the output image. The left camera 130 and the right camera 140 are installed to capture more than 170° based on the vertical line of the ground direction. Herein, the installation location of each camera varies according to the type of the vehicle and may be limited by a design of the vehicle.

Generally, a wide-angle camera is subject to the image quality degradation because of lack of the light around a lens, and more distortion occurs around the lens than the center of the lens. When the image captured through the camera is viewpoint-transformed, the image quality of the periphery is severely degraded. Thus, to use the image formed in the center of the camera lens, the front camera 110 and the rear camera 120 are installed such that their optical axis is parallel with the horizon, and the left camera 130 and the right camera 140 are installed perpendicularly to the ground.

As shown in FIGS. 2 and 4, the heights of the cameras 110, 120, 130, and 140 are adjusted to capture the range up to about 1.5 m away from the front, the rear, the left side, and the right side of the vehicle. At this time, the camera can take a picture from about 30° to 60° from the vertical axis based on the ground.

Meanwhile, while the cameras are installed to the front, rear, left, and right sides of the vehicle respectively in FIG. 1 to ease the understanding, the embodiment of the present invention can be realized using two or more cameras.

That is, the camera can be installed in each of the left side and the right side of the vehicle, or the camera can be installed in each of the front side and the rear side of the vehicle. Also, the camera can be installed in each of the front side, the left side, and the right side of the vehicle.

Figure 5:
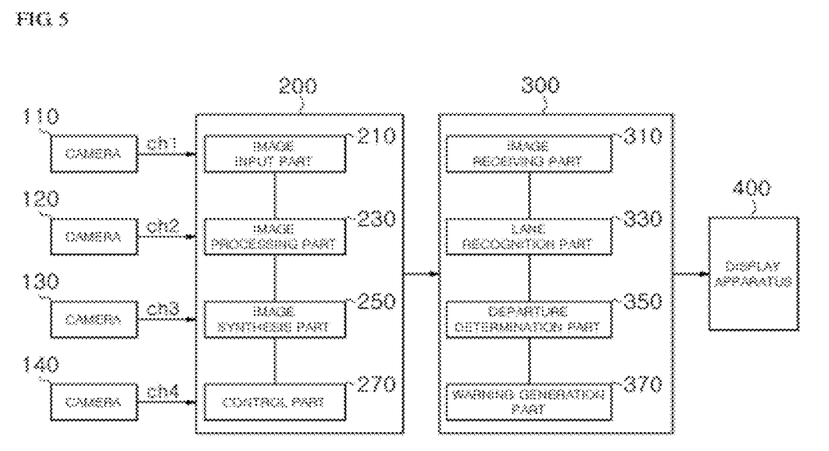
FIG. 5 is a diagram of a lane sensing system using a vehicle surrounding image according to an embodiment of the present invention.

FIG. 5 is a diagram of a lane sensing system using a vehicle surrounding image according to an embodiment of the present invention.

As shown in FIG. 5, the lane sensing system can include a plurality of cameras 110, 120, 130, and 140, an image generating apparatus 200, a lane departure sensing apparatus 300, and a display apparatus 400.

The plurality of the cameras 110, 120, 130, and 140 is installed to the front, the rear, the left side, and the right side of the vehicle respectively, can include a lens of a wide view angle such as wide-angle lens or fisheye lens, and includes a pinhole camera. The cameras 110, 120, 130, and 140 capture a three-dimensional object as two-dimensional images D1, D2, D3 and D4 through the lens having the wide view angle over 170°, and the captured images are sent to the image generating apparatus 200 over four channels ch1, ch2, ch3, and ch4 respectively.

The image generating apparatus 200 includes an image input part 210, an image processing part 230, an image synthesis part 250, and a control part 270.

The image input part 210 receives the images D1, D2, D3 and D4 captured through the plurality of the cameras 110, 120, 130, and 140 over the respective channels ch1, ch2, ch3, and ch4.

The image processing part 230 image-processes the captured images D1, D2, D3 and D4 received from the image input part 210 using a look up table, and generates and outputs revised images E1, E2, E3 and E4 from the captured images D1, D2, D3 and D4. Herein, the look up table can be generated by applying a distortion correction algorithm, an Affine transformation algorithm, and a viewpoint transformation algorithm.

The image synthesis part 250 receives the revised images E1, E2, E3 and E4 revised by the image processing part 230, and processes to synthesize the received revised images E1, E2, E3 and E4 in an overlay scheme which overlaps the images. Herein, the image synthesis part 250 processes the overlay synthesis using a mask image. The mask image contains region information per channel ch1, ch2, ch3, and ch4 and weight information of pixels constituting the revised image.

The control part 270 controls to naturally display the overlapping region by adjusting the weight of the pixels in the overlapping region between the revised images E1, E2, E3 and E4.

As such, the image synthesis part 250 generates the surrounding image through which 360° around the vehicle can be viewed at a look by synthesizing and processing the four revised images E1, E2, E3 and E4 in the overlay manner.

A lane departure sensing apparatus 300 includes an image receiving part 310, a lane recognition part 330, a departure determination part 350, and a warning generation part 370.

First, the image receiving part 310 receives the generated synthetic image around the vehicle from the image generating apparatus 200. The received image displays not only the moving vehicle but also the lane and the obstacle around the vehicle.

The lane recognition part 330 recognizes the lane in both sides of the vehicle from the vehicle surrounding image, and extracts virtual lanes corresponding to the left and right lanes of the vehicle.

The departure determination part 350 generates lane departure information of the currently running vehicle by calculating a distance and an angle between the virtual line indicating the vehicle progress and the lane.

When the lane departure of the vehicle is detected, the warning generation part 370 sends the lane departure information to the display apparatus 400 or generates an alarm sound or a steering wheel vibration.

The display apparatus 400 is a apparatus capable of displaying the surrounding image generated by the image generating apparatus 200. When receiving the lane departure information from the lane departure sensing apparatus 300, the display apparatus 400 changes a screen to a warning mode screen. For example, the display apparatus 400 makes the displayed screen flicker or changes the screen into a red color indicating the warning. The display apparatus 400 can be implemented using a separate display or a navigation installed in the vehicle, and may be included to the image generating apparatus 200 or the lane departure sensing apparatus 300.

While the image generating apparatus 200 and the lane departure sensing apparatus 300 are separately illustrated in FIG. 5 to ease the understanding, the components of the image generating apparatus 200 can be included in the lane departure sensing apparatus 300 and united as the lane departure sensing apparatus using the vehicle surrounding image.

Figure 6:
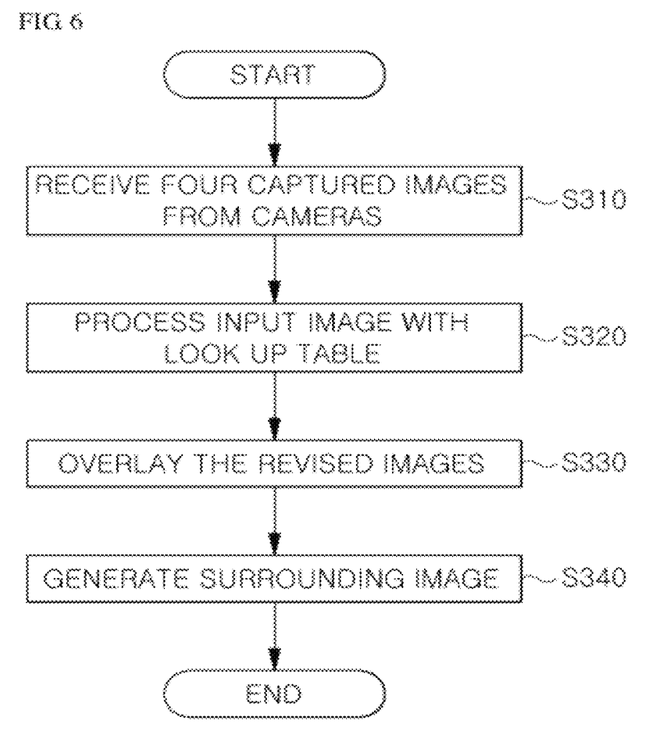
FIG. 6 is a flowchart of a method for generating the surrounding image according to an embodiment of the present invention.
Figure 7:
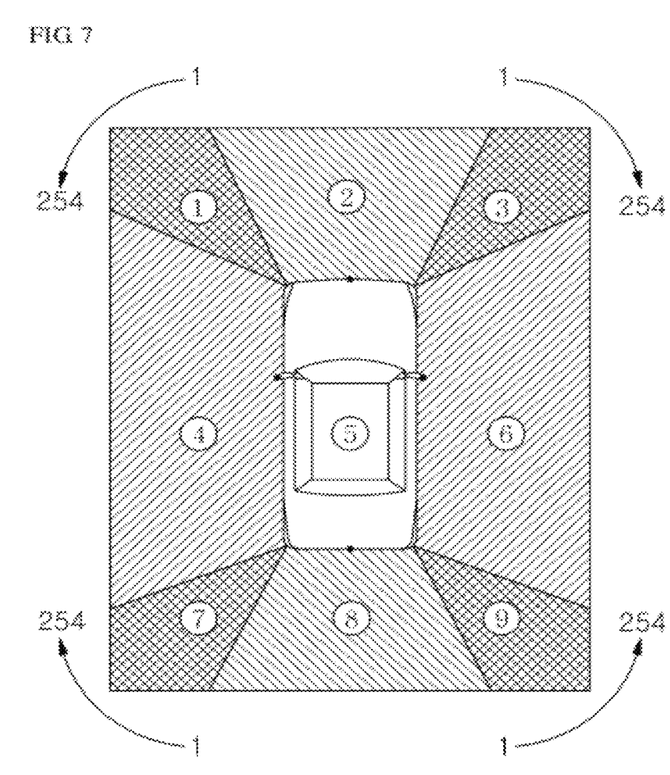
FIG. 7 is a flowchart of a mask image according to an embodiment of the present invention.
Figure 8:
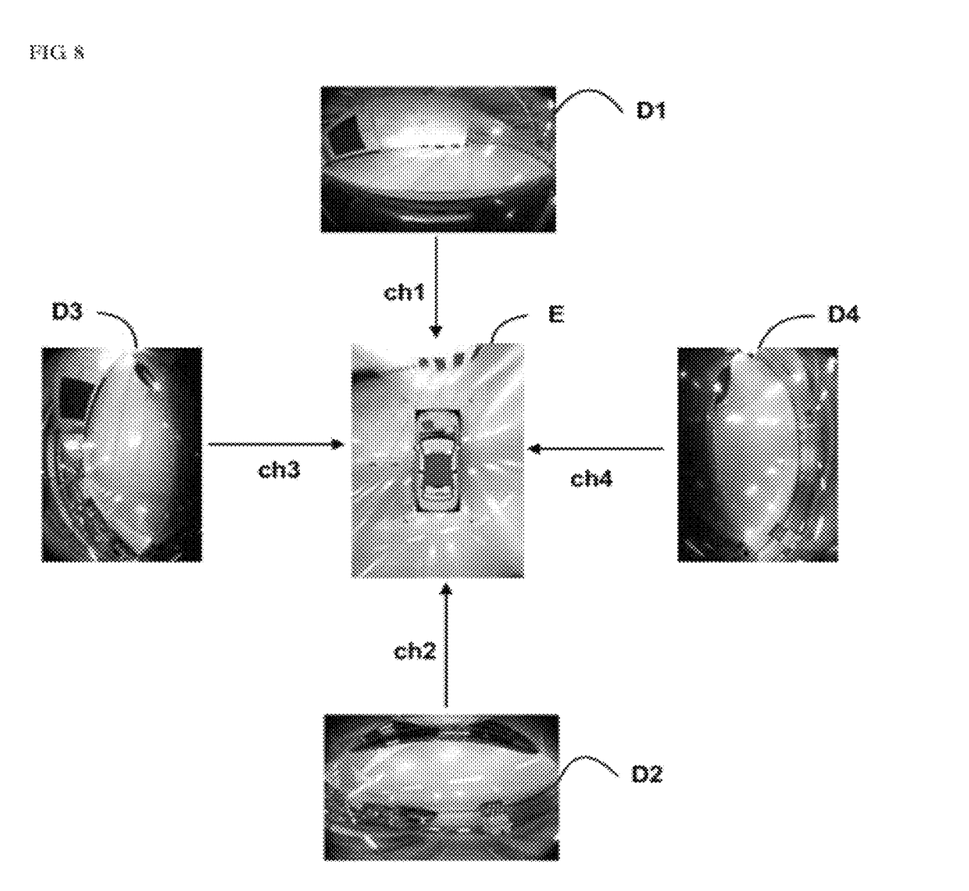
FIG. 8 is a diagram of the surrounding image overlaying the overlapping regions according to an embodiment of the present invention.

Hereafter, a method of the image generating apparatus 200 for generating the surrounding image of the vehicle is explained through FIGS. 6 through 8. FIG. 6 is a flowchart of a method for generating the surrounding image according to an embodiment of the present invention.

First, the image generating apparatus 200 receives the images D1, D2, D3 and D4 captured through the cameras 110, 120, 130, and 140 over the channels ch1, ch2, ch3, and ch4 (S310). As stated in FIGS. 1 through 4, the composition of the captured images D1, D2, D3 and D4 varies according to the installation location and height of the cameras 110, 120, 130, and 140.

Next, the image generating apparatus 200 revises the received captured images D1, D2, D3 and D4 using the look up table (S320) and thus generates the revised images E1, E2, E3 and E4 fit for the overlay processing. The look up table adopts the distortion correction algorithm, the Affine transformation algorithm, and the viewpoint transformation algorithm, which are described now respectively.

First, the distortion correction algorithm is an algorithm for correcting geometric distortion caused by the camera lens. Since actual wide-angle lens or fisheye lens is not completely round and has a short focal length, the geometric distortion of the lens, for example, radial distortion or tangential distortion can take place. Due to such lens distortion, a straight line in the captured image can be transformed and represented as a curved line. That is, pincushion distortion where a distortion factor k indicating the distortion of the lens is smaller than zero can occur, or barrel distortion where the lens distortion factor k is greater than zero can occur.

Hence, through the distortion correction algorithm, the geometrical distort images of the lens can be corrected. Herein, the distortion correction algorithm can be expressed using a function relating to a correction parameter and the distortion factor. The correction parameter can include the focal length and optical center coordinates of the lens mounted to the camera, and the distortion factor can include a radial distortion factor and a tangential distortion factor.

According to an embodiment of the present invention, the distortion correction algorithm of Equation 1 can be applied.

$$u = f_x \times \{x' \times (1 + k_1 \times r^2 + k_2 \times r^4) + 2p_1 \times x' \times y' + p_2(r^2 + 2x'^2)\} + c_x$$

$$v = f_y \times \{y' \times (1 + k_1 \times r^2 + k_2 \times r^4) + p_1(r^2 + 2y'^2) + 2p_2 \times x' \times y'\} + c_y \quad \text{[Equation 1]}$$

Here, x' and y' denote coordinates of a correction index image on an image plane, u and v denote coordinates on a lens plane to which three-dimensional space coordinates are projected, $f_x$ and $f_y$ denote the focal length of the lens, and $c_x$ and $c_y$ denote the optical center coordinates of the lens. $k_1$ and $k_2$ denote the radial distortion factor, $p_1$ and $p_2$ denote the tangential distortion factor, and $r^2 = x'^2 + y'^2$. Herein, the correction index image can be formed in a lattice shape and is the image used to correct the geometric distortion of the lens.

The Affine transformation indicates point mapping which represents the two-dimensional space in one dimension, and passes through rotation (R), translation (T), and scaling (S) transformations. In general, the Affine transformation can be expressed as Equation 2.

$$W = A \times D + B \quad \text{[Equation 2]}$$

Here, W denotes two-dimensional color image data output through the Affine operation, A denotes a first transformation coefficient for linear magnification and reduction, and rotation of the two-dimensional color image data, D denotes two-dimensional color image data input on the frame basis, and B denotes a second transformation coefficient for realizing linear translation of the two-dimensional color image data D.

The viewpoint transformation algorithm transforms the captured images D1, D2, D3 and D4 input through the four channels into a top view viewpoint. That is, the viewpoint transformation algorithm transforms the viewpoint of the input images D1, D2, D3 and D4 to the image looked down from above.

The image generating apparatus 200 overlay-processes the revised images E1, E2, E3 and E4 using the region information per channel ch1, ch2, ch3, and ch4 and the weight information of the pixels stored in the mask image (S330). Herein, the image generating apparatus 200 generates the final surrounding image of the vehicle by overlay-processing the overlapping region between the plurality of the revised images using the mask image (S340).

FIG. 7 is a diagram of the mask image according to an embodiment of the present invention.

According to an embodiment of the present invention, the mask image is used to overlay and synthesize the four revised images E1, E2, E3 and E4 into one image.

The mask image contains the region information per channel ch1, ch2, ch3, and ch4 and pixel value information corresponding to each region, and is divided into nine regions as shown in FIG. 7. As shown in FIG. 7, the mask image sets to overlay the image captured by the front camera 110 input via the channel ch1 with the first, second, and third regions, and to overlay the image captured by the rear camera 120 input via the channel ch2 with the seventh, eighth, and ninth regions. The mask image sets to overlay the image captured by the left camera 130 input via the channel ch3 with the first, fourth, and seventh regions, and to overlay the image captured by the right camera 140 input via the channel ch4 with the third, sixth, and ninth regions. Herein, the first, third, seventh, and ninth regions are the overlapping regions duplicately captured by the plurality of the cameras. That is, the first region is the overlapping region duplicately captured by the front camera 110 and the left camera 130, and the third region is the overlapping region duplicately captured by the front camera 110 and the right camera 140. The seventh region is the overlapping region duplicately captured by the rear camera 120 and the left camera 130, and the ninth region is the overlapping region duplicately captured by the rear camera 120 and the right camera 140.

The control part 270 moves the image corresponding to the second, fourth, sixth, and eighth regions which are not duplicately captured, to the same region of the surrounding image corresponding to a destination image. The control part 270 overlay-processes the first, third, seventh, and ninth regions which are the overlapping regions duplicately captured by the multiple cameras, using the mask image.

To distinguish colors, the mask image displays the second, fourth, sixth, and eighth regions in monochrome without color variation. To distinguish the vehicle, the fifth region corresponding to the vehicle is set to adjust R, G and B pixel values.

The mask image sets each pixel in the first, third, seventh, and ninth regions to have the R pixel value ranging from 1 to 254. In particular, the mask image sets the R pixel value of each pixel in the first, third, seventh, and ninth regions to a Gradient weight value between 1 and 254 for the natural color matching as shown in FIG. 7. The first region, for example, sets the R pixel value of the pixel adjoining the second region to 1, and sets the R pixel value of the pixel adjoining the fourth region to 254 by increasing the R pixel value of the pixel closer to the fourth region.

Likewise, as shown in FIG. 7, the third region sets the R pixel value of the pixel adjoining the second region to 1 and the R pixel value of the pixel adjoining the sixth region to 254. The seventh region sets the R pixel value of the pixel adjoining the eighth region to 1 and the R pixel value of the pixel adjoining the fourth region to 254. The ninth region sets the R pixel value of the pixel adjoining the eighth region to 1 and the R pixel value of the pixel adjoining the sixth region to 254.

Herein, since the first, third, seventh, and ninth regions which are the overlapping regions of the images between the neighboring channels are separately distinguished and viewed according to brightness or lightness difference of each camera, the control part 270 can perform the overlay operation by applying Equation 4 to each pixel in the first, third, seventh, and ninth regions.

$$I'(t+1)=\alpha I_1(t)+(1-\alpha)I_2(t), 0 \leq \alpha \leq 1 \qquad \text{[Equation 3]}$$

In Equation 3, $I_1(t)$ and $I_2(t)$ denote image information for the overlapping region input over two channels respectively, $\alpha$ denotes the weight for the pixels in the overlapping region, and $I'(t+1)$ denotes the overlay-processed image information. Particularly, $I_1(t)$ denotes the image information for the overlapping region captured by the camera 110 installed to the front or the camera 120 installed to the rear and input over the channel ch1 or the channel ch2, and $I_2(t)$ denotes the image information for the overlapping region captured by the camera 130 installed to the left side or the camera 140 installed to the right side and input over the channel ch3 or the channel ch4.

$\alpha$ is the weight for the R pixel in the overlapping region. For example, in the adjoining part of the first region and the second region, $\alpha$ is a value (1/255) close to zero. In the adjoining part of the first region and the fourth region, $\alpha$ is a value (254/255) close to 1.

As such, by overlay-processing the overlapping region generated between the revised images E1, E2, E3 and E4 through the mask image, the image generating apparatus 200 can generate the surrounding image naturally displaying the overlapping region.

FIG. 8 is a diagram of the surrounding image with the overlapping region overlay-processed according to an embodiment of the present invention.

As shown in FIG. 8, the image generating apparatus 200 can receive the images D1, D2, D3 and D4 captured through the cameras 110, 120, 130, and 140 over the four channels ch1, ch2, ch3, and ch4, overlay-process the overlapping regions using the mask image, and thus generate the surrounding image E synthesized to naturally display the overlapping regions.

Figure 9:
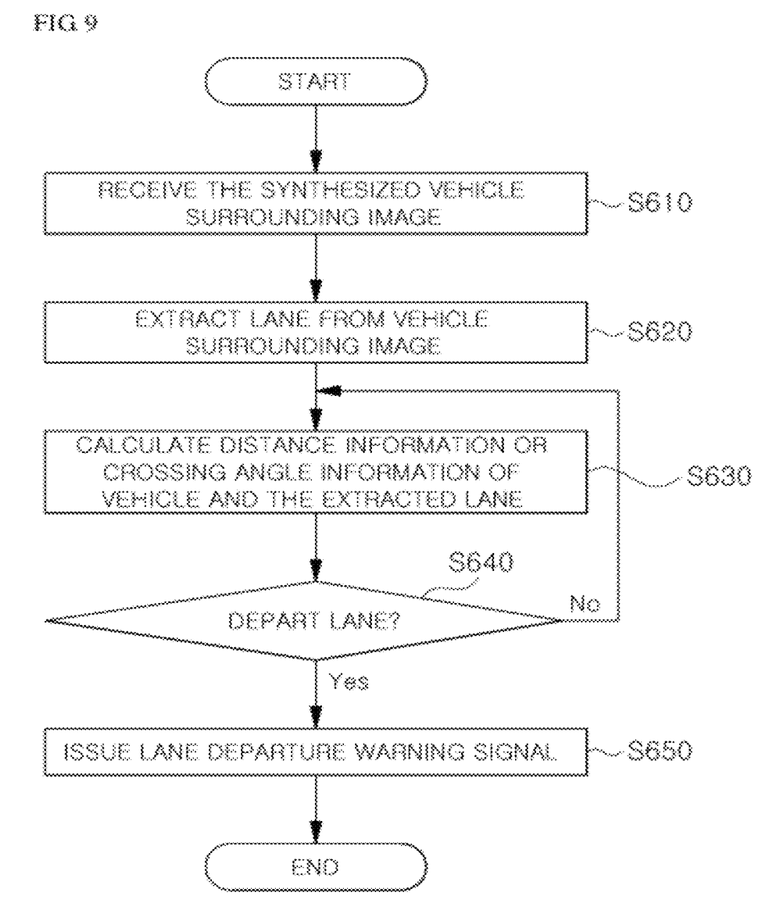
FIG. 9 is a flowchart of a method for sensing the lane departure according to an embodiment of the present invention.
Figure 11:
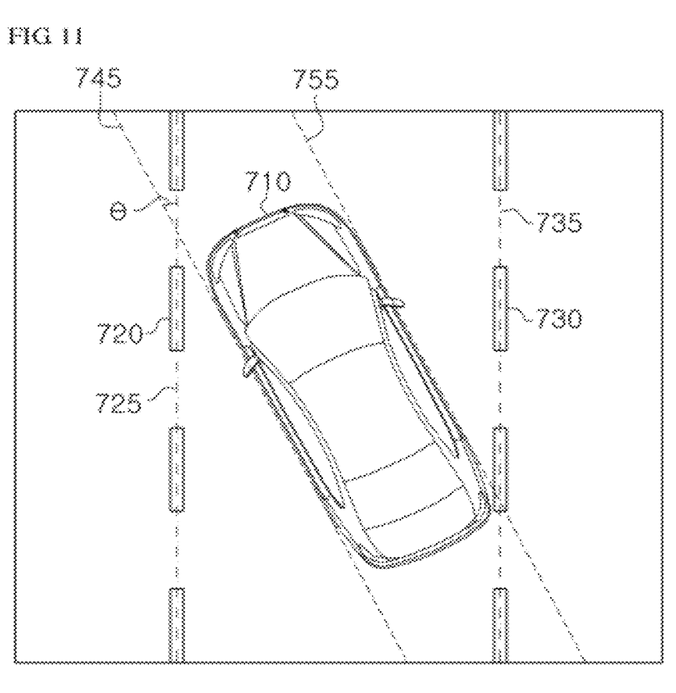
Figure 12:
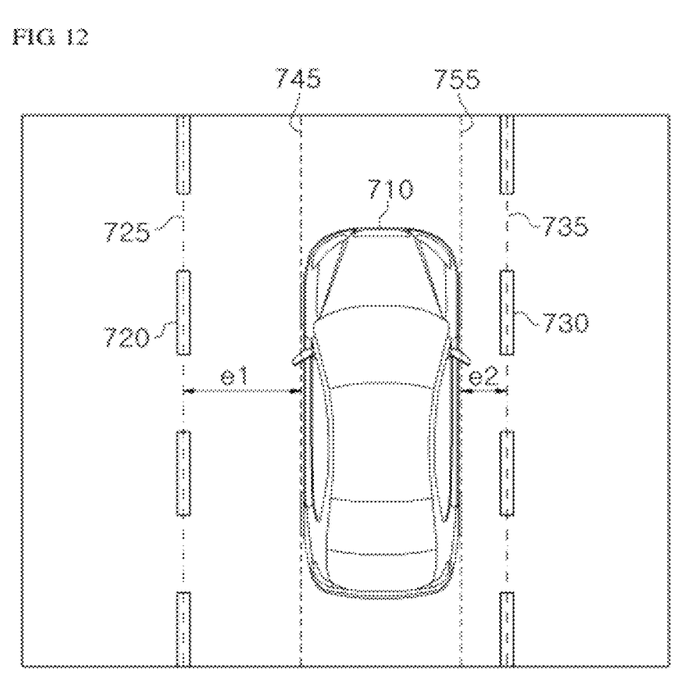

Using the surrounding image of the vehicle generated by the image generating apparatus 200 as above, the lane departure sensing apparatus 300 can determine whether the moving vehicle departs from the lane. Hereafter, a method of the lane departure sensing apparatus 300 for generating the surrounding image of the vehicle is illustrated through FIGS. 9 through 12. FIG. 9 is a flowchart of the lane departure sensing method according to an embodiment of the present invention, and FIGS. 10 through 12 are vehicle surrounding images for illustrating the lane departure sensing method according to an embodiment of the present invention.

First, the lane departure sensing apparatus 300 receives the synthesized vehicle surrounding image from the image generating apparatus 200 (S610). Herein, the running image of the driving vehicle is displayed in the top view form as shown in FIGS. 10 and 11. As shown in FIG. 10, the image shows a vehicle 710 running on the road and left and right lanes 720 and 730 in both sides of the moving vehicle 710.

The lane departure sensing apparatus 300 extracts the lane from the synthesized vehicle surrounding image received from the image generating apparatus 200 (S620). Herein, a method for extracting the lane from the synthesized image can use hough transform. The hough transform is an algorithm for detecting a straight line using particular points in two-dimensional image coordinates. Hence, the lane departure sensing apparatus 300 extracts the left lane using virtual coordinates of an intersection a of the lane and the top of the screen and an intersection b of the lane of the bottom of the screen in FIG. 10. Likewise, the left lane is extracted using virtual coordinates of an intersection c of the lane and the top of the screen and an intersection d of the lane of the bottom of the screen.

Figure 10:
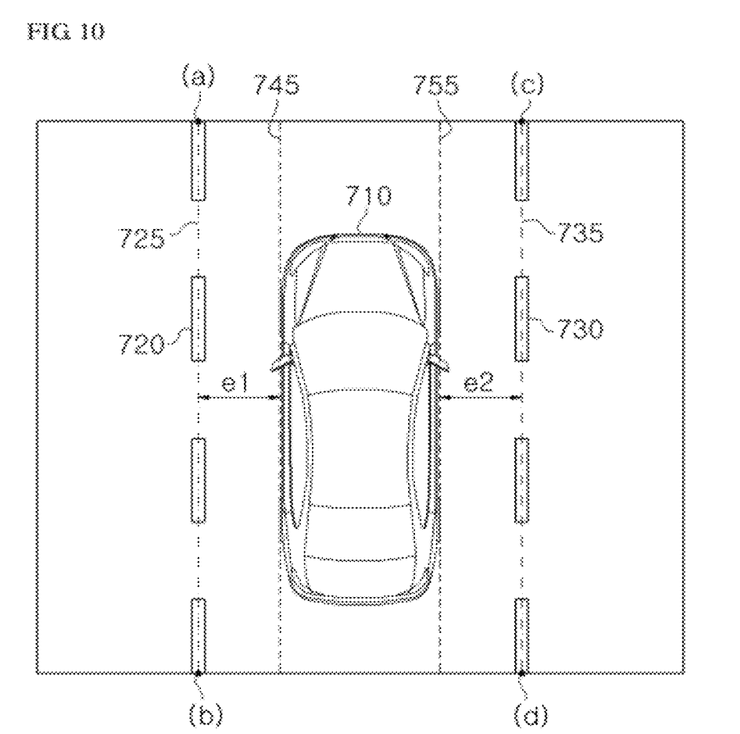
FIGS. 10 through 12 are vehicle surrounding images for illustrating the lane departure sensing method according to an embodiment of the present invention.

Thus, the lane departure sensing apparatus 300 extracts and displays in the synthesized image, a left virtual lane 725 and a right virtual lane 735 corresponding to the left and right lanes 720 and 730 of the road where the vehicle 710 is running as shown in FIG. 10. Also, the lane departure sensing apparatus 300 displays virtual moving direction lines 744 and 755 indicating the moving direction of the vehicle in the left and right sides of the vehicle respectively. That is, the lane departure sensing apparatus 300 generates and displays the left moving direction line 745 which is the virtual extension line by connecting left front wheel and rear wheel of the vehicle, and generates and displays the right moving direction line 755 which is the virtual extension line by connecting right front wheel and rear wheel of the vehicle 710.

The lane departure sensing apparatus 300 measures distances e1 and e2 between the left and right virtual lanes 725 and 735 and the left and right sides of the vehicle, and measures a crossing angle formed by the left and right virtual lanes 725 and 735 and the left and right moving direction lines 745 and 755 (S630). That is, the lane departure sensing apparatus 300 measures the distance e1 between the left moving direction line 745 of the vehicle and the left virtual lane 725, and measures the crossing angle at the intersection of the left moving direction line 745 and the left virtual lane 725. Likewise, the lane departure sensing apparatus 300 measures the distance e2 between the right moving direction line 755 of the vehicle and the right virtual lane 735, and measures the crossing angle at the intersection of the right moving direction line 755 and the right virtual lane 735.

The lane departure sensing apparatus 300 determines whether the distances e1 and e2 between the left and right virtual lanes 725 and 735 and the left and right sides of the vehicle or the crossing angles formed by the left and right virtual lanes 725 and 735 and the left and right moving direction lines 745 and 755 lie within a reference range (S640). Herein, the reference range is set by considering an ample time taken for the driver to recognize the issued warning and to change the vehicle moving in the lane departure direction to the normal direction.

FIGS. 11 and 12 are the surrounding images of the vehicle departing the lane. As shown in FIG. 11, when the calculated angle θ formed by the left virtual lane 725 and the left moving direction line 745 is greater than the reference angle, the lane departure sensing apparatus 300 determines that the running vehicle moves out of the lane.

Meanwhile, when the vehicle runs in parallel with the lane, the intersecting points of the left and right virtual lanes 725 and 735 and the left and right moving direction lines 745 and 755 are not formed. However, as shown in FIG. 12, when the distance e1 between the left moving direction line 745 and the left virtual lane 725 of the vehicle is wider than the reference distance or when the distance e2 between the right moving direction line 755 and the right virtual lane 735 of the vehicle is narrower than the reference distance, the lane departure sensing apparatus 300 determines that the running vehicle moves out of the lane. Also, when the distances e1 and e2 between the left and right virtual lanes 725 and 735 and the left and right moving direction lines 745 and 755 gradually decrease or increase, the lane departure sensing apparatus 300 determines that the running vehicle moves out of the lane.

When determining that the running vehicle moves out of the lane, the lane departure sensing apparatus 300 generates a lane departure warning signal (S650). When sensing that the vehicle departs the lane, the lane departure sensing apparatus 300 functions to send the lane departure information to the display apparatus 400 or to generate the alarm sound or the steering wheel vibration. The display apparatus 400 receiving the lane departure information makes the displayed screen flicker, or changes the screen into the red color indicating the warning.

While the lane departure sensing apparatus 300 may generate the warning signal immediately when the vehicle departs the lane, it may generate the warning signal only when the vehicle departs the lane over a certain time period.

Meanwhile, the lane departure sensing apparatus 300 according to an embodiment of the present invention can sense not only the lane departure of the vehicle but also an object in front of the vehicle, for example, a vehicle in front of the vehicle, a pedestrian, or various obstacles. That is, the lane departure sensing apparatus 300 detects the distance change with the currently running vehicle by extracting the coordinates of the front object from the top-view vehicle surrounding image. Accordingly, even when the distance between the vehicle and the front object continuously decreases, the alarm sound is issued.

While the invention has been shown and described with reference to certain exemplary embodiments thereof, it will be understood by those skilled in the art that various changes in form and details may be made therein without departing from the spirit and scope of the invention as defined by the appended claims and their equivalents.

INDUSTRIAL APPLICABILITY

According to the present invention, by removing blind spots around the running vehicle and revising and processing the overlapping region captured by the plurality of the images into the natural look, the lane departure can be detected more accurately. Also, the driver running on the road can recognize the situation around the vehicle and the lane departure information accurately and rapidly without greatly relying on a side-view mirror or a rear-view mirror during the driving, and prevent in advance accidents caused by the drunk driving or the drowsy driving.

What is claimed is:

1. A lane departure sensing method using a vehicle surrounding image, comprising:
receiving images captured by a plurality of cameras installed to a car running, over respective channels connected to the cameras;
generating a plurality of revised images by revising the captured images into a top-view;
generating the vehicle surrounding image by synthesizing the plurality of the revised images;
extracting a lane from the vehicle surrounding image, and determining lane departure by calculating distance information between the vehicle and the extracted lane or angle information formed by a moving direction of the vehicle and the extracted lane; and when determining the lane departure, issuing a warning, wherein the plurality of the revised images is generated using a look up table, wherein the generating of the vehicle surrounding image generates the vehicle surrounding image by overlaying the plurality of the revised images using a mask image which comprises region information per channel and weight information for pixels forming each region, wherein overlapping regions between the plurality of the revised images are overlay-processed using the following equation:

$$l'(t+1)=\alpha l_1(t)+(1-\alpha)l_2(t), 0\leq\alpha\leq 1$$

where $l_1(t)$ and $l_2(t)$ denote image information for the overlapping region input via two channels respectively, a denotes a weight for pixels in the overlapping region, and $l'(t+1)$ denotes the overlay-processed image information, wherein the mask image is set to attain a Gradient weight for the pixels in the overlapping region, wherein the plurality of cameras include a front camera, a rear camera, a left camera and a right camera, wherein the front camera and the rear camera are installed such that their optical axis is parallel with the horizon, and the left camera and the right camera are installed perpendicularly to the ground, and wherein the mask image includes a first region duplicately captured through the front camera and the left camera of a vehicle, a third region duplicately captured through the front camera and the right camera of the vehicle, a seventh region duplicately captured through the rear camera and the left camera of the vehicle, a ninth region duplicately captured through the rear camera and the right camera of the vehicle, a second region captured through the front camera of the vehicle, without being duplicately captured through any other camera, a fourth region captured through the left camera of the vehicle, without being duplicately captured through any other camera, a sixth region captured through the right camera of the vehicle, without being duplicately captured through any other camera, an eighth region captured through the rear camera of the vehicle, without being duplicately captured through any other camera, and a fifth region on which an image corresponding to the vehicle is displayed.

2. The lane departure sensing method using the vehicle surrounding image as in claim 1, wherein the determining of the lane departure comprises:

displaying a moving direction line indicating a moving direction of the vehicle, around the vehicle;

generating the distance information or the angle information by measuring a distance between the moving direction line and the extracted lane and measuring a crossing angle of the moving direction line and the extracted lane; and when the distance information or the angle information exceeds a reference range, determining the lane departure.

3. A lane departure sensing apparatus using a vehicle surrounding image, comprising:

an image input part for receiving images captured by a plurality of cameras installed to a car running, over respective channels connected to the cameras;

an image processing part for generating a plurality of revised images by revising the captured images into a top-view;

an image synthesis part for generating the vehicle surrounding image by synthesizing the plurality of the revised images; and a lane departure sensing part for extracting a lane from the vehicle surrounding image, calculating distance information of the vehicle and the extracted lane or angle information formed by a moving direction of the vehicle and the extracted lane, and determining lane departure based on the calculated distance information or the angle information, wherein the image synthesis part generates the vehicle surrounding image by overlaying the plurality of the revised images using a mask image which comprises region information per channel and weight information for pixels forming each region, wherein the plurality of the revised images is generated using a look up table, wherein overlapping regions between the plurality of the revised images are overlay-processed using the following equation:

$$l'(t+1)=\alpha l_1(t)+(1-\alpha)l_2(t), 0\leq\alpha\leq 1$$

where $l_1(t)$ and $l_2(t)$ denote image information for the overlapping region input via two channels respectively, a denotes a weight for pixels in the overlapping region, and $l'(t+1)$ denotes the overlay-processed image information, wherein the mask image is set to attain a Gradient weight for the pixels in the overlapping region, wherein the plurality of cameras include a front camera, a rear camera, a left camera and a right camera, wherein the front camera and the rear camera are installed such that their optical axis is parallel with the horizon, and the left camera and the right camera are installed perpendicularly to the ground, and wherein the mask image includes a first region duplicately captured through the front camera and the left camera of a vehicle, a third region duplicately captured through the front camera and the right camera of the vehicle, a seventh region duplicately captured through the rear camera and the left camera of the vehicle, a ninth region duplicately captured through the rear camera and the right camera of the vehicle, a second region captured through the front camera of the vehicle, without being duplicately captured through any other camera, a fourth region captured through the left camera of the vehicle, without being duplicately captured through any other camera, a sixth region captured through the right camera of the vehicle, without being duplicately captured through any other camera, an eighth region captured through the rear camera of the vehicle, without being duplicately captured through any other camera, and a fifth region on which an image corresponding to the vehicle is displayed.

4. The lane departure sensing apparatus using the vehicle surrounding image as in claim 3, further comprising:

a warning generation part for issuing a warning when determining the lane departure.

5. A lane departure sensing system using a vehicle surrounding image, comprising:

a plurality of cameras installed to a vehicle which is moving and outputting captured images over respective channels;

an image generating apparatus for generating a plurality of revised images by revising the captured input images into a top-view, and generating the vehicle surrounding image by synthesizing the plurality of the revised images;

a lane departure sensing apparatus for extracting a lane from the vehicle surrounding image, calculating distance information between the vehicle and the extracted lane or angle information formed by a moving direction of the vehicle and the extracted lane, determining lane departure from the distance information or the angle information, and issuing a warning when determining the lane departure; and a display apparatus for displaying the surrounding image or a warning screen, wherein the image generating apparatus generates the vehicle surrounding image by overlaying the plurality of the revised images using a mask image which comprises region information per channel and weight information for pixels forming each region, wherein the plurality of the revised images is generated using a look up table, wherein overlapping regions between the plurality of the revised images are overlay-processed using the following equation:

$$l'(t+1) = \alpha l_1(t) + (1-\alpha) l_2(t), \ 0 \le \alpha \le 1$$

where $l_1(t)$ and $l_2(t)$ denote image information for the overlapping region input via two channels respectively, $\alpha$ denotes a weight for pixels in the overlapping region, and $l'(t+1)$ denotes the overlay-processed image information, wherein the mask image is set to attain a Gradient weight for the pixels in the overlapping region, wherein the plurality of cameras include a front camera, a rear camera, a left camera and a right camera, wherein the front camera and the rear camera are installed such that their optical axis is parallel with the horizon, and the left camera and the right camera are installed perpendicularly to the ground, wherein the mask image includes a first region duplicately captured through the front camera and the left camera of a vehicle, a third region duplicately captured through the front camera and the right camera of the vehicle, a seventh region duplicately captured through the rear camera and the left camera of the vehicle, a ninth region duplicately captured through the rear camera and the right camera of the vehicle, a second region captured through the front camera of the vehicle, without being duplicately captured through any other camera, a fourth region captured through the left camera of the vehicle, without being duplicately captured through any other camera, a sixth region captured through the right camera of the vehicle, without being duplicately captured through any other camera, an eighth region captured through the rear camera of the vehicle, without being duplicately captured through any other camera, and a fifth region on which an image corresponding to the vehicle is displayed.

* * * * *